United States Patent
Hass

(10) Patent No.: US 9,535,792 B2
(45) Date of Patent: Jan. 3, 2017

(54) SYSTEM AND METHOD FOR POLICY BASED MANAGEMENT OF A COMMUNICATION DEVICE CONFIGURATION PERSISTENCE

(71) Applicant: Dell Products, LP, Round Rock, TX (US)

(72) Inventor: Jon R. Hass, Austin, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 216 days.

(21) Appl. No.: 14/548,971

(22) Filed: Nov. 20, 2014

(65) Prior Publication Data

US 2016/0147627 A1 May 26, 2016

(51) Int. Cl.
*G06F 11/00* (2006.01)
*G06F 11/14* (2006.01)
*G06F 11/22* (2006.01)
*G06F 9/445* (2006.01)

(52) U.S. Cl.
CPC ....... *G06F 11/1417* (2013.01); *G06F 9/44505* (2013.01); *G06F 11/2284* (2013.01); *G06F 11/1441* (2013.01)

(58) Field of Classification Search
CPC .............. G06F 11/1417; G06F 11/1438; G06F 11/1441; G06F 11/22; G06F 11/2278; G06F 11/2284; G06F 9/4401; G06F 9/4403; G06F 9/445; G06F 9/44505; G06F 1/24; G06F 1/30; G06F 11/0748
See application file for complete search history.

(56) References Cited

U.S. PATENT DOCUMENTS

| | | | | |
|---|---|---|---|---|
| 5,317,752 A | * | 5/1994 | Jewett | G06F 1/12 714/14 |
| 5,557,777 A | * | 9/1996 | Culbert | G06F 11/1417 700/293 |
| 5,832,283 A | * | 11/1998 | Chou | G06F 1/3203 713/1 |
| 5,902,352 A | * | 5/1999 | Chou | G06F 9/4881 718/100 |
| 5,951,686 A | * | 9/1999 | McLaughlin | G06F 11/1417 713/2 |
| 6,202,091 B1 | * | 3/2001 | Godse | G06F 9/4408 709/220 |
| 7,299,347 B1 | * | 11/2007 | Kao | G06F 9/4401 709/220 |

(Continued)

*Primary Examiner* — Gabriel Chu
(74) *Attorney, Agent, or Firm* — Larson Newman, LLP

(57) ABSTRACT

An information handling system includes a communication device and a service processor. The communication device includes a first terminal, and a second terminal to communicate with a network storage array. The service processor includes a first terminal to receive persistence policy for the communication device. The service processor is configured to detect a reset of the information handling system, to determine a type of reset performed in an information handling system, to evaluate the persistence policy with respect to the type of reset during a power-on self test executed in the information handling system after the information handling system, and to configure, via the first terminal of the communication device, the attributes of the communication device based on the persistence policy and the type of reset.

20 Claims, 3 Drawing Sheets

(56) References Cited

U.S. PATENT DOCUMENTS

| | | | |
|---|---|---|---|
| 8,510,592 B1* | 8/2013 | Chan | G06F 11/0745 714/5.1 |
| 2005/0055598 A1* | 3/2005 | Chen | G06F 11/1417 714/2 |
| 2005/0102384 A1* | 5/2005 | Ueno | H04L 12/2803 709/223 |
| 2006/0101089 A1 | 5/2006 | Parr et al. | |
| 2009/0132745 A1* | 5/2009 | Watanabe | G06F 1/3203 710/266 |
| 2009/0249434 A1* | 10/2009 | Challener | G06F 9/4401 726/1 |
| 2009/0307476 A1* | 12/2009 | Khatri | G06F 9/4401 713/2 |
| 2013/0055256 A1 | 2/2013 | Banga et al. | |

\* cited by examiner

SYSTEM AND METHOD FOR POLICY BASED MANAGEMENT OF A COMMUNICATION DEVICE CONFIGURATION PERSISTENCE

FIELD OF THE DISCLOSURE

The present disclosure generally relates to system and method for policy based management of a communication device configuration persistence.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

An information handling system can include communication devices that include attributes to control how the communication device communicates with a target storage node within a network. These attributes may be maintained during a restart of the information handling system if the communication device has an auxiliary power source. Additionally, the attributes may be maintained during a system restart if the attributes are stored in a non-volatile memory.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
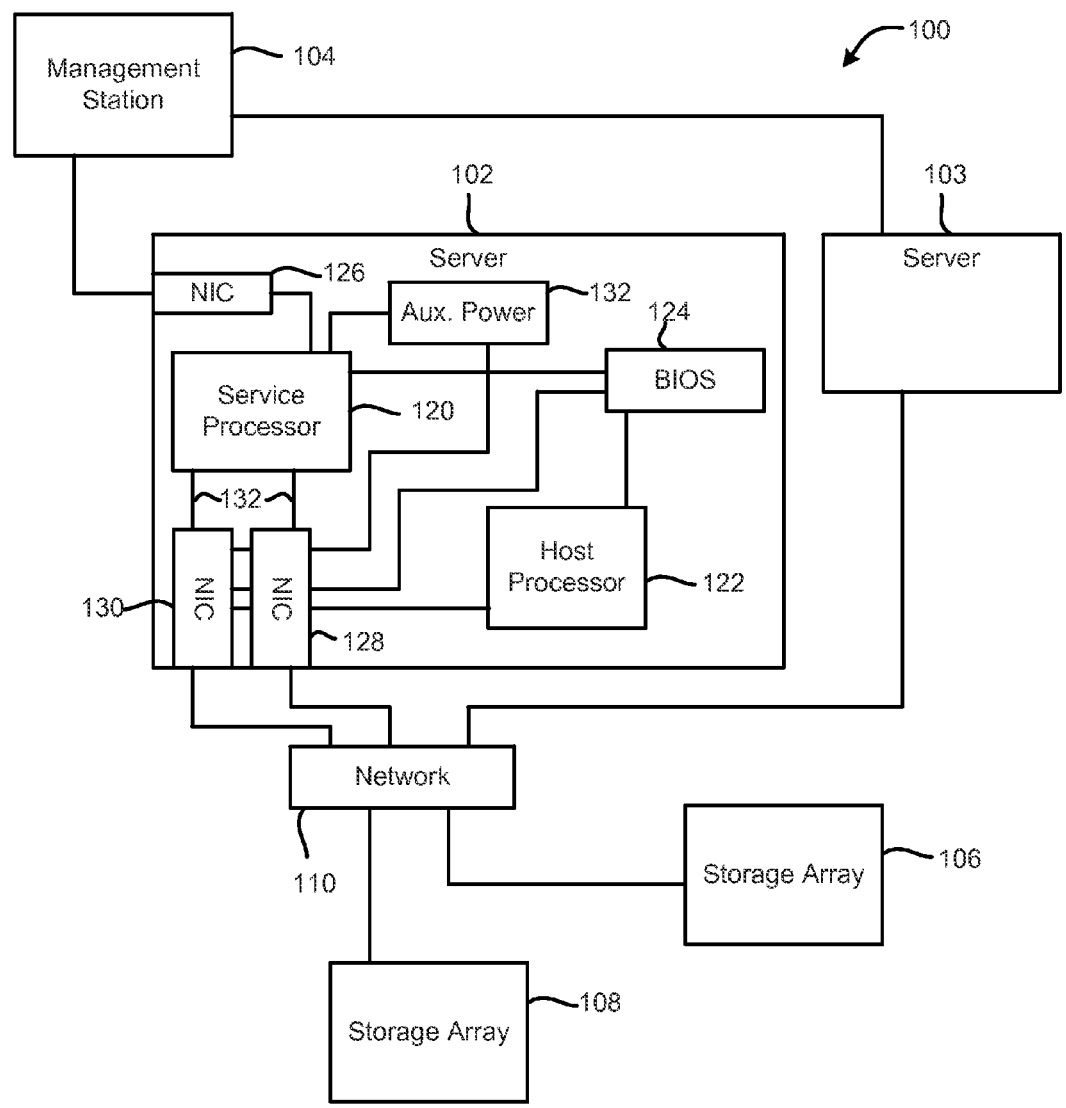
FIG. 1 is a block diagram of an information handling system.

FIG. 1 shows an information handling system 100. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

The information handling system 100 includes servers 102 and 103, a management station 104, storage arrays 106 and 108 connected to the management station via a network 210, and a deployment image 112 including a memory 114. In an embodiment, the servers 102 and 103 are substantially similar, such that for clarity and brevity the description will be with respect to server 102. The server 102 includes a service processor 120, a host processor 122, a basic input/output system (BIOS) 124, communication devices, such as network interface cards (NICs) 126, 128, and 130, and an auxiliary power device 132. The service processor 120 includes multiple input/output terminals to communicate with the BIOS 124, the NICs 126, 128, and 130, and to receive power from the auxiliary power device 132. The host processor 122 includes multiple input/output terminals to communicate with the BIOS 124 and with the NIC 128. The BIOS 124 and the NICs 128 and 130 also include input/output terminals to communicate with each other.

In an embodiment, the NIC 126 can be a dedicated NIC for the service processor 120 to communicate with the management station 1044. In another embodiment, NIC 126 can be a separate communication port on NIC 128 or 130 that is dedicated to the service processor 120 for communication with the management station 104.

In an embodiment, an individual can utilize the management station 104 to manage the server 102, such as to set persistence policies for attributes of the communication devices, such as NICs 126, 128, and 130, the BIOS 124. In the embodiment shown in FIG. 1, the communication devices are NICs. However, in other embodiments the communication devices can be converged network adaptors (CNAs), hub bus adaptors (HBAs), or the like. In an embodiment, the persistence policies can control whether particular attributes of a communication device persist or are cleared in response to different events in the server 102. The different events that can take place to cause the persistence policy to be carried out are: an alternating current (AC) power loss to the server 102; a cold reset of server 102; a warm reset of the server; or the like. During an AC power loss, the entire server 102 loses power including the auxiliary power device 132. In an embodiment, a cold reset can be when a power button for the server 102 is pressed to turn the server off and then back on. During the cold reset, the auxiliary power device 132 remains on to provide power to the components connected to the auxiliary power device, but the power on the main power bus is removed. Thus, attributes stored in volatile memory of components connected to the auxiliary power device 132 can be maintained during the cold reset. In an embodiment, during a warm reset the auxiliary power device 132 remains on, the BIOS 124 performs a peripheral component interconnect (PCI) reset, but the BIOS does not power down the entire server 102.

An individual can set different persistence policies for the components within the server 102. For example, one persistence policy can override intrinsic hardware behavior, such that the persistence policy causes data in non-volatile flash memory to be cleared during a boot sequence after a reset of the server 102 even though this data is typically maintained in the non-volatile memory during the loss of power during the reset. In this policy, configurations of initiators stored in flash memory of the NICs 128 and 130 can be cleared during a subsequent boot sequence after the reset of the server 102, so that the server 102 does not reconnect to the same storage array 106 or 108 after a reset.

A persistence policy can include that data, such as virtual addresses for the NICs 128 and 130, in volatile memory of the NICs is maintained during the reset of the server 102. In this persistence policy, the data in the volatile memory is backed up during a boot sequence in a persistent memory so that during the boot sequence after the reset of the server 102, the data can be copied back into the volatile memory, such as random access memory (RAM) within the NICs 128 and 130. This copied back procedure can cause the attributes to be maintained in the volatile memory during a reset of the server 102.

In an embodiment, an individual can group the persistence policies by hardware components, or by a functional area, such as an initiator configuration. For example, an individual can create three types of groups of persistence policies. In an embodiment, the persistence policy groups can be a group for partitions of ports on the NICs 128 and 130, a policy group for initiators in the NICs, and a policy group for virtual addresses stored in the NICs. The persistence policy for a group can cause a different result during the different types of resets with respect to whether data within the components of the group is maintained. For example, a persistence policy for initiators within the NIC 128 can cause the attributes of the initiators, stored in non-volatile memory, to be cleared during a power-on self test (POST) of the BIOS 124 after a cold reset or an AC power loss of the server 102, but to be maintained during the POST after a warm reset. Thus, in this example, the persistence policy for the initiators can override the typical characteristic of the non-volatile memory, such as always maintaining data, in response to the cold reset or AC power loss, but keep the characteristic of the non-volatile memory in response to the warm reset.

In an embodiment, a persistence policy could be that AC power loss will cause the server 102 to revert to factory default settings. In an embodiment, the information handling system 100 can have a service level agreement (SLA) that causes the operations of server 102 to failover to server 103 in response to a crash of an executing workload. In this embodiment, the server 103 can immediately begin booting the workload in response to the crash of the workload on server 102. When the server 103 boots the workload, server 102 can no longer access the workload within causing consistency problems. Thus, in response to any reset, such as cold or warm reset, the persistence policy can clear all attributes within the NICs 128 and 130 of the server 102. Therefore, the persistence policy prevents both servers 102 and 103 from trying to boot the same workload on one of the storage arrays 106 or 108 in response to a reset of server 102.

During operation of the server 102, the management station 104 can provide the persistence policies to the service processor 120. In an embodiment, the service processor 120 can receive power from the auxiliary power device 132, such that the service processor is always on, except in the event of AC power loss to the server 102, to receive the persistence policies from the management station 104. After the persistence policies have been stored in the service processor 120, the server 102 continues normal operation, such as the host processor 122 communicating with either storage array 106 or 108 via NIC 128 or 130 and network 110. However, in response to a reset or an AC power loss of the server 102, the service processor 120 determines what type of restart occurred. This determination can be made by the service processor 120 while a POST of the BIOS 124 is being executed after the reset of the server 102. The reset can be categorized as an AC power loss, a cold reset, a warm reset, or the like.

The BIOS 124 can provide a handshake signal to the service processor 120 after the NICs 128 and 130 have been powered up but before a PCI Init signal is sent to the NICs. In an embodiment, the PCI Init signal can be an initialization signal that causes the NICs 128 and 130 to begin communicating with their target storage array. The POST is then stalled in response to the BIOS 124 providing the handshake signal to the service processor 120 to enable the service processor time to evaluate the persistence policies for the server 102. In an embodiment, the timing of the handshake signal allows the service processor 120 to be able to communicate with the NICs 128 and 130 and perform any necessary operations defined in the persistence policies before the NICs connect to the storage arrays 106 and 108.

In an embodiment, the service processor 120 can communicate with the NICs 128 and 130 via a sideband interface 134, or through the BIOS 124 acting as a proxy for the service processor. The service processor 120 can configure each of the NICs 106 and 108 based on the persistence policies for the NICs and the type of reset of the server 102. In an embodiment, the service processor 120 can configure the both the non-volatile and the volatile memory within the NICs 106 and 108 to set the attributes for the NICs based on the persistence policy. For example, if the service processor 120 determines that a cold reset of the server 102 occurred, the service processor can clear all of the attributes for the NICs 128 and 130 including the attributes for the initiators, stored in non-volatile memory, and the attributes for the virtual addresses of storage array 106 or 108, stored in volatile memory.

The service processor 120 can complete configuring the NICs 106 and 108 based on the persistence policies, and can then provide a response handshake to the BIOS 124 to notify the BIOS that the configuration of the NICs 106 and 108 is complete. In an embodiment, the response handshake causes the BIOS 124 to continue with the POST and to initialize the NICs 128 and 130 by sending the PCI Init signal to the NICs. The NICs 128 and 130 can then establish a connection with the storage arrays 106 and 108 based on the attributes configured by the service processor 120.

The service processor 120 can therefore utilize persistence policies to configure the NICs 128 and 130 after a reset of the server 102. In an embodiment, the persistence policies can be implemented regardless of whether the configuration of the NICs 128 and 130 after the persistence policy is contrary to the intrinsic characteristics of the NICs, regardless of whether the NIC receives power from the auxiliary power device 132, or the like. In the described embodiment, the persistence policies have been stored and executed in the service processor 120. However, in another embodiment, the persistence policies can be stored and executed by the BIOS 124 without deviating from the described embodiments.

Figure 2:
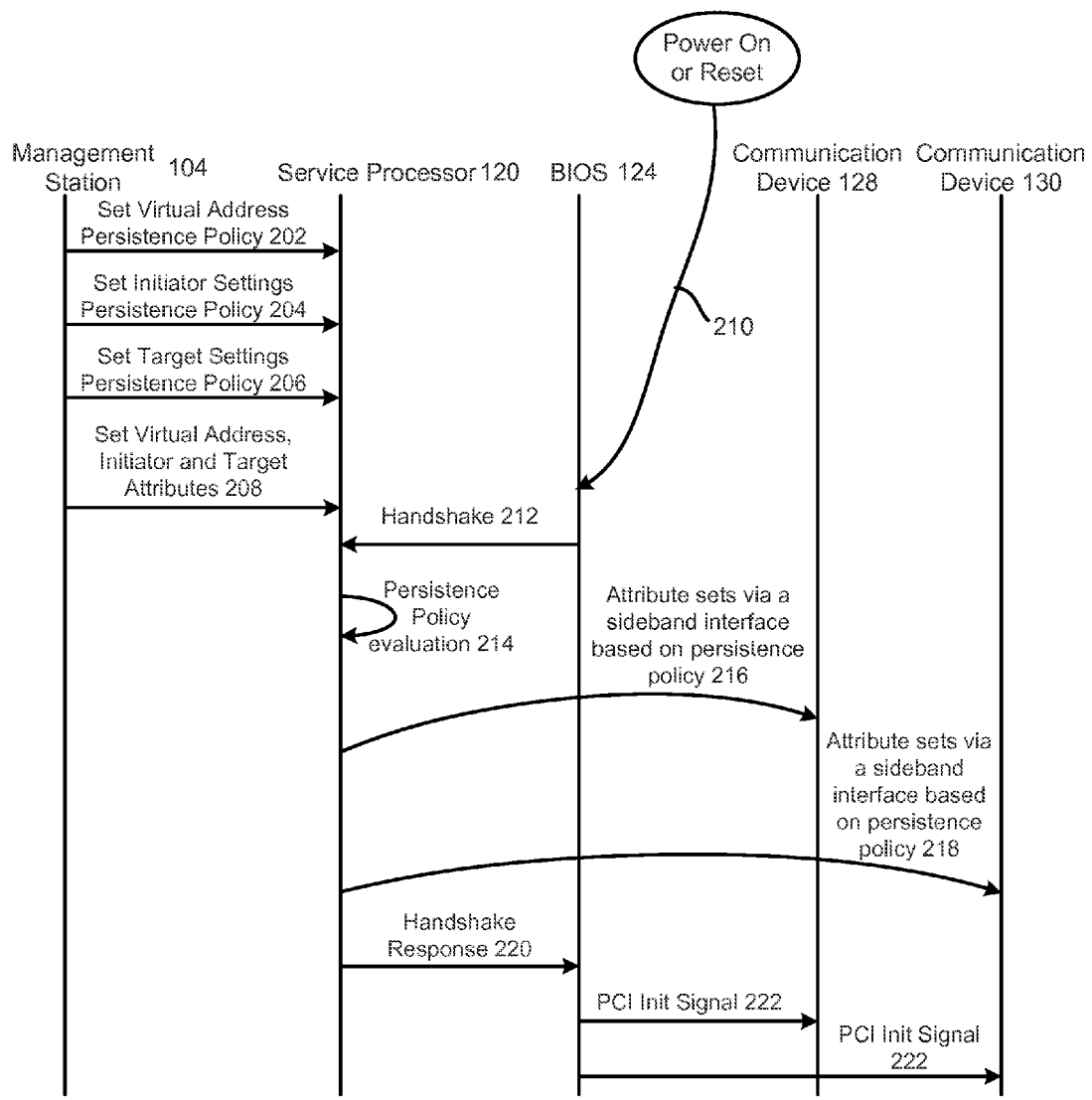
FIG. 2 is a diagram illustrating communication between different components of the information handling system.

FIG. 2 shows communications between the management station 104, the service processor 120, the BIOS 124, and the NICs 128 and 130. In an embodiment, the management station 104 can provide multiple persistence policies to the service processor 120. For example, the management station 104 can provide a virtual address persistence policy 202, an initiator persistence policy 204, and a target settings persistence policy 206. The service processor 120 can stored these policies for later use, such as after a reset of the server 102. The management station 104 can also provide the service processor with attributes 208 to configure the NICs with a current virtual address, initiator, and target attributes. A reset 210 of the server can occur, which in turn can cause a POST of the BIOS 124 to be performed as described above. During the POST, a handshake signal 212 is provided from the BIOS 124 to the service processor 120. The handshake signal 212 can cause the service processor 120 to evaluate the persistence policies 202, 204, and 206 during operation 214. In an embodiment, the persistence policies can be evaluated based on the type of reset of the server, such as an AC power loss, a cold reset of the server, a warm reset of the server, or the like.

The service processor 120 can set attributes of the communication devices 128 and 130 based on the persistence policies and type of reset. The service processor 120 can set attributes of the communication device 128 via a signal 216 on a sideband interface in between the service processor and the communication device 128. Similarly, the service processor 120 can set attributes of the communication device 130 via a signal 218 on the sideband interface in between the service processor and the communication device 130.

After the service processor 120 has configured the communication devices 128 and 130, the service processor can send a handshake response signal 220 to the BIOS 124. The handshake response signal 220 can cause the BIOS 124 to continue the POST and to send an initialization signal 222, such as a PCI Init signal, to communication device 128 and an initialization signal 224 to the communication device 130. The initialization signals 222 and 224 can then cause the communication devices 128 and 130 to connect with target storage nodes identified in the attributes stored in the communication devices.

Figure 3:
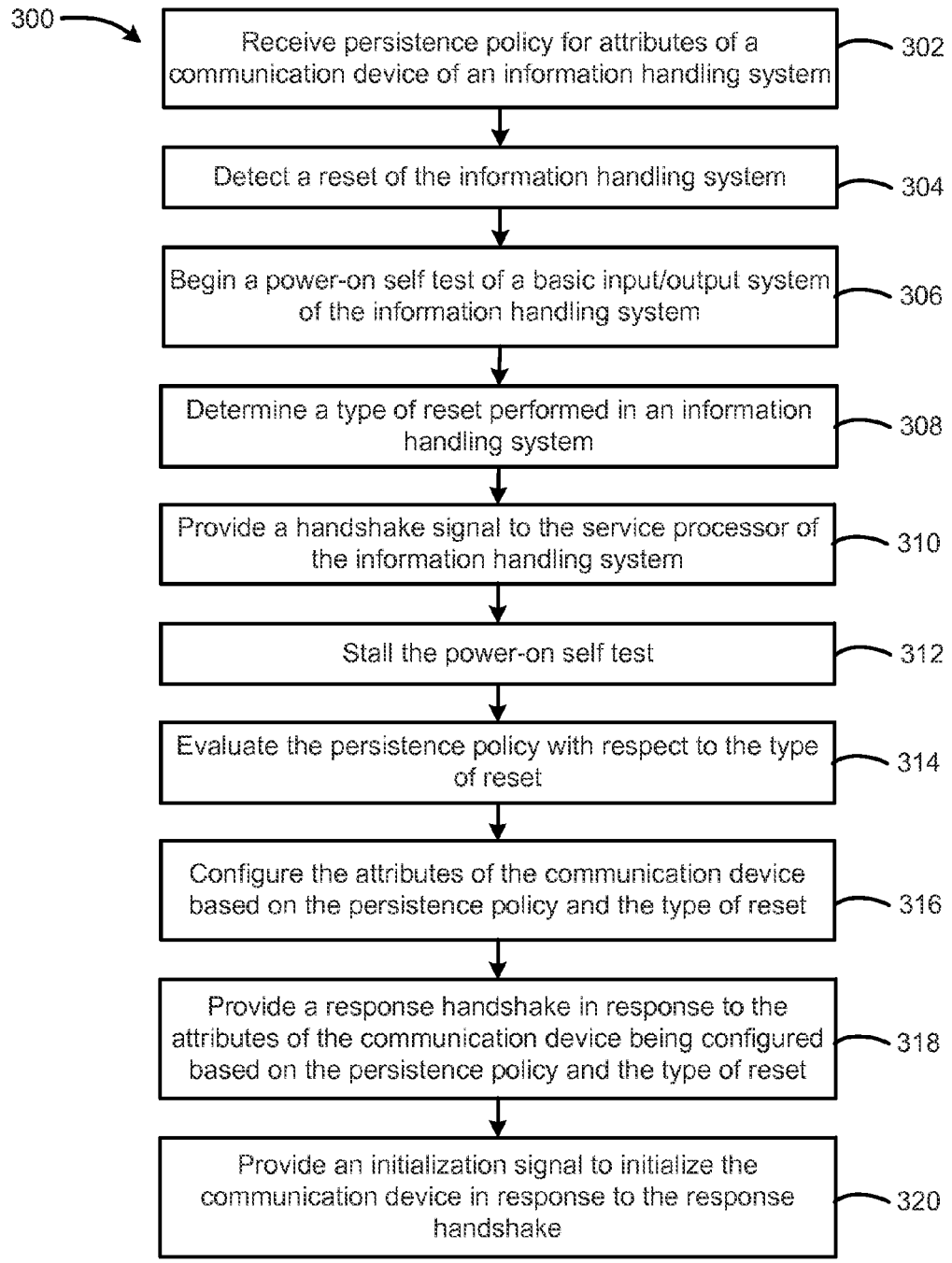
FIG. 3 is a flow diagram of a method for controlling persistence policy settings of a communication device within the information handling system.

FIG. 3 shows a flow diagram of a method 300 for controlling persistence policy settings of a communication device within the information handling system. At block 302, a persistence policy for attributes of a communication device is received at a service processor of an information handling system. In an embodiment, the communication device is selected from a group consisting of a network interface card, a converged network adapter, a hub bus adapter, or the like. In an embodiment, the persistence policy can override intrinsic configurations of the communication device. For example, the persistence policy could cause non-volatile memory to be cleared during a reset of the information handling system. At block 304, a reset of the information handling system is detected. A power-on self test (POST) of a basic input/output system (BIOS) of the information handling system is begun at block 306.

At block 308, a type of reset performed in the information handling system is determined. In an embodiment, the type of reset can be an AC power loss, a cold reset, a warm reset, or the like. In an embodiment, the cold reset includes a main power bus of the information handling system being powered down, power in an auxiliary power device of the information handling system being maintained while the main power bus powered down, and the main power bus being powered back up. In an embodiment, the warm reset includes a peripheral component interconnect (PCI) reset being performed, power in an auxiliary power device of the information handling system being maintained, and power on a main power bus of the information handling system being maintained.

A handshake signal is provided to the service processor at block 310. At block 312, the POST is stalled in response to providing the handshake signal. The persistence policy is evaluated with respect to the type of reset of the information handling system at block 314. At block 316, the attributes of the communication device are configured based on the persistence policy and the type of reset. In an embodiment, the service processor can configure the attributes via a sideband interface in between the service processor and the communication device. In an embodiment, the service processor can configure the attributes via the BIOS acting as a proxy for the service processor. In response to the attributes of the communication device being configured based on the persistence policy and the type of reset, a response handshake is provided at block 318. At block 320, an initialization signal to initialize the communication device is provided in response to the response handshake.

Modifications, additions, or omissions may be made to the information handling system 100 described herein without departing from the scope of the disclosure. For example, information handling system 100 may include any number of components such as the server 102, the management station 104, and the storage arrays 106 and 108. Additionally, the server 102 can include multiple components including the service processor 120, the host processor 122, the BIOS 124, the NICs 126, 128, and 130, and the auxiliary power device 132. In different embodiments, these components may be integrated or separated. Moreover, the operations may be performed by more, fewer, or other components. Additionally, the operations may be performed using any suitable logic comprising software, hardware, and/or other logic.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims.

In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system comprising:
   a communication device including a first terminal, and a second terminal to communicate with a network storage array; and
   a service processor including a first terminal to receive persistence policy for the communication device, to detect a reset of the information handling system, to determine a type of reset performed in an information handling system, to evaluate the persistence policy with respect to the type of reset during a power-on self test executed in the information handling system after the information handling system is reset, and to configure, via the first terminal of the communication device, the attributes of the communication device based on the persistence policy and the type of reset.

2. The information handling system of claim 1 further comprising:
   a basic input/output system including a first terminal, the basic input/output system to provide a handshake signal to the service processor during the power-on self test, to stall the power-on self test in response to the handshake signal being provided, to receive a response handshake from the service processor in response to the attributes of the communication device being configured based on the persistence policy and the type of reset, and to provide an initialization signal to initialize the communication device in response to the response handshake.

3. The information handling system of claim 1 wherein the type of reset is selected from a group consisting of an alternating current power loss, a cold reset, and a warm reset.

4. The information handling system of claim 3 wherein the cold reset includes a main power bus of the information handling system being powered down, power in an auxiliary power device of the information handling system being maintained while the main power bus powered down, and the main power bus being powered back up.

5. The information handling system of claim 3 wherein the warm reset includes a peripheral component interconnect (PCI) reset being performed, power in an auxiliary power device of the information handling system being maintained, and power on a main power bus of the information handling system being maintained.

6. The information handling system of claim 1 wherein the persistence policy for the attributes of the communication device varies based on the type of reset.

7. The information handling system of claim 1 wherein the communication device is selected from a group consisting of a network interface card, a converged network adapter, and a hub bus adapter.

8. A method comprising:
   receiving, at a service processor of an information handling system, a persistence policy for attributes of a communication device;
   detecting a reset of the information handling system;
   determining a type of reset performed in the information handling system;
   evaluating the persistence policy with respect to the type of reset during a power-on self test executed in the information handling system after the information handling system is reset, and
   configuring the attributes of the communication device based on the persistence policy and the type of reset.

9. The method of claim 8 wherein the type of reset is selected from a group consisting of an alternating current power loss, a cold reset, and a warm reset.

10. The method of claim 9 wherein resetting the information handling system with the cold reset comprises:
    powering down a main power bus of the information handling system;
    maintaining power in an auxiliary power device of the information handling system while the main power bus powered down; and
    powering up the main power bus.

11. The method of claim 9 wherein resetting the information handling system with the warm reset comprises:
    performing a peripheral component interconnect (PCI) reset;
    maintaining power in an auxiliary power device of the information handling system; and
    maintaining power on a main power bus of the information handling system.

12. The method of claim 8 wherein the persistence policy for the attributes of the communication device varies based on the type of reset.

13. The method of claim 8 wherein the communication device is selected from a group consisting of a network interface card, a converged network adapter, and a hub bus adapter.

14. The method of claim 8 further comprising:
    providing a handshake signal to the service processor during the power-on self test;
    stalling the power-on self test in response to providing the handshake signal;
    providing a response handshake in response to the attributes of the communication device being configured based on the persistence policy and the type of reset;
    providing an initialization signal to initialize the communication device in response to the response handshake.

15. A non-transitory computer readable medium including code for performing a method, the method comprising:
    receiving, at a service processor of an information handling system, a persistence policy for attributes of a communication device;
    determining a type of reset performed in the information handling system;
    evaluating the persistence policy with respect to the type of reset during a power-on self test executed in the information handling system after the information handling system is reset; and
    configuring the attributes of the communication device based on the persistence policy and the type of reset.

16. The computer readable medium of claim 15 wherein the type of reset is selected from a group consisting of an alternating current power loss, a cold reset, and a warm reset.

17. The computer readable medium of claim 16 wherein resetting the information handling system with the cold reset causes the processor to:
- power down a main power bus of the information handling system;
- maintain power in an auxiliary power device of the information handling system while the main power bus powered down; and
- power up the main power bus.

18. The computer readable medium of claim 16 wherein resetting the information handling system with the warm reset comprises:
- performing a peripheral component interconnect (PCI) reset;
- maintaining power in an auxiliary power device of the information handling system; and
- maintaining power on a main power bus of the information handling system.

19. The computer readable medium of claim 15 wherein the persistence policy for the attributes of the communication device varies based on the type of reset.

20. The computer readable medium of claim 15 further comprising:
- providing a handshake signal to the service processor during the power-on self test;
- stalling the power-on self test in response to providing the handshake signal;
- providing a response handshake in response to the attributes of the communication device being configured based on the persistence policy and the type of reset;
- providing an initialization signal to initialize the communication device in response to the response handshake.

* * * * *